(12) United States Patent
Lutz

(10) Patent No.: US 11,541,936 B1
(45) Date of Patent: Jan. 3, 2023

(54) CHASSIS FOR A VEHICLE AND METHOD FOR FORMING A CHASSIS FOR A VEHICLE

(71) Applicant: Luvly AB, Nyköping (SE)

(72) Inventor: Håkan Glanton Lutz, Nyköping (SE)

(73) Assignee: Luvly AB, Nyköping (SE)

( * ) Notice: Subject to any disclaimer, the term of this patent is extended or adjusted under 35 U.S.C. 154(b) by 0 days.

(21) Appl. No.: 17/504,052

(22) Filed: Oct. 18, 2021

(30) Foreign Application Priority Data

Oct. 15, 2021 (EP) .................................... 21202793

(51) Int. Cl.
  *B62D 23/00* (2006.01)
  *B62D 65/02* (2006.01)
  *B62D 29/00* (2006.01)
  *B62D 27/02* (2006.01)

(52) U.S. Cl.
  CPC .......... *B62D 23/005* (2013.01); *B62D 27/02* (2013.01); *B62D 27/023* (2013.01); *B62D 29/001* (2013.01); *B62D 29/005* (2013.01); *B62D 65/024* (2013.01)

(58) Field of Classification Search
  CPC ...... B62D 24/00; B62D 23/005; B62D 23/00; B62D 27/023; B62D 29/001; B62D 29/005; B62D 29/02; B62D 65/024
  USPC ........... 296/203.01–203.4, 187.01–2, 181, 1, 296/193.01
  See application file for complete search history.

(56) References Cited

U.S. PATENT DOCUMENTS

| | | | |
|---|---|---|---|
| 5,042,395 A | 8/1991 | Wackerle et al. | |
| 5,320,403 A | 6/1994 | Kazyak | |
| 6,237,989 B1 | 5/2001 | Ammerlaan et al. | |
| 9,567,013 B2 | 2/2017 | Ehrlich et al. | |
| 11,161,548 B2 * | 11/2021 | Lutz | B62D 29/048 |
| 2008/0044630 A1 | 2/2008 | Lusk et al. | |
| 2013/0313862 A1 | 11/2013 | Yamaji et al. | |
| 2015/0158532 A1 | 6/2015 | Ayuzawa et al. | |
| 2017/0240215 A1 | 8/2017 | LaRose et al. | |

(Continued)

FOREIGN PATENT DOCUMENTS

| | | |
|---|---|---|
| DE | 102012213469 B3 | 11/2013 |
| DE | 102013105987 A1 | 12/2013 |

(Continued)

OTHER PUBLICATIONS

E-spacenet English Abstract of DE 102012213469.

(Continued)

*Primary Examiner* — Dennis H Pedder

(74) *Attorney, Agent, or Firm* — Kagan Binder, PLLC

(57) ABSTRACT

The present invention relates to a chassis (10) for a vehicle comprising a plurality of sandwich plate elements (100) and a plurality of connection elements (200, 200', 200a-c) for connecting said plurality of sandwich plate elements (100). Each connection element (200, 200', 200a-c) comprises two or more recesses (210, 220) configured to receive an edge portion (160) of one of the plurality of sandwich plate elements (100). The plurality of connection elements (200, 200', 200a-c) comprises at least one connection element (200', 200a-c) which has at least one external surface (202a-e) provided with a connection configuration (250a-e) for a mortise and tenon type joint. A method (20) for forming a chassis (10) for a vehicle is also provided.

15 Claims, 12 Drawing Sheets

(56) References Cited

U.S. PATENT DOCUMENTS

| | | |
|---|---|---|
| 2018/0118265 A1 | 5/2018 | Gallier |
| 2019/0283810 A1 | 9/2019 | Nothdurfter et al. |
| 2020/0039586 A1 | 2/2020 | Ayuzawa |
| 2020/0108876 A1 | 4/2020 | Wang |

FOREIGN PATENT DOCUMENTS

| | | | |
|---|---|---|---|
| DE | 202016003447 U1 | | 8/2016 |
| EP | 0523831 A1 | | 1/1993 |
| EP | 2327609 A2 | | 6/2011 |
| EP | 3109123 A1 | | 12/2016 |
| EP | 3538423 B1 | | 3/2021 |
| JP | H0418120 U | * | 2/1992 |
| WO | 03/045767 A1 | | 6/2003 |
| WO | 2016156746 A1 | | 10/2016 |

OTHER PUBLICATIONS

E-spacenet English Abstract of DE 102013105987.
E-spacenet English Abstract of DE 202016003447.
E-spacenet English Abstract of EP 3109123.
E-spacenet English Abstract of WO 2016156746.
E-spacenet English Abstract of WO U.S. Appl. No. 03/045,767.

* cited by examiner

CHASSIS FOR A VEHICLE AND METHOD FOR FORMING A CHASSIS FOR A VEHICLE

CROSS-REFERENCE TO RELATED APPLICATIONS

This application claims priority to European Application No. 21202793.2, filed Oct. 15, 2021 and titled "CHASSIS FOR A VEHICLE AND METHOD FOR FORMING A CHASSIS FOR A VEHICLE," the disclosure of which is incorporated herein by reference in its entirety.

FIELD OF INVENTION

The present disclosure generally relates to a chassis for a vehicle and a method for forming a chassis for a vehicle.

TECHNICAL BACKGROUND

Within the field of vehicle construction, vehicles are universally built around chassis. The chassis is commonly a load-bearing framework which structurally supports the vehicle. The actual construction of the chassis may vary from vehicle to vehicle, but the chassis as such will generally support the complete vehicle and hence greatly contribute to the structural integrity of the vehicle. The chassis typically distributes tensile and compressive forces throughout itself, contributing to the vehicle's overall stiffness and hence its torsional stiffness.

In vehicle construction, the most common type of chassis is a so-called "body-on-frame" construction. A typical "body-on-frame" chassis exhibits a frame which handles the tensile and compressive forces. The frame is thereafter typically "skinned" with a body when the vehicle is built. Though the body which is built or "skinned" onto the frame sometimes is referred to as a "unibody" in the automotive industry, the body handles little of the forces on the vehicle. Moreover, there are several disadvantages with frame-based chassis. As they are constructed with conventional joints, the joints must be very stiff and thus often heavy as well as bulky. The joints may also reduce the stiffness of the chassis as such. Further, the generally inefficient transfer of forces means that other members of the frame may also need to be thick and heavy, giving less space inside the vehicles for passengers or goods. Furthermore, the heavy and bulky joints in combination with other thick and heavy members typically imply that there is no or little room for altering or tailoring the chassis without having to subject the chassis to a substantial or even complete redesign.

As an alternative, very rigid chassis can be formed as monocoque chassis. As the name implies a monocoque chassis is typically formed as "one body". Such chassis generally exhibit excellent stiffness characteristics, and thus high safety for passengers or goods as well as good handling characteristics. One drawback with monocoque chassis is that they are expensive and difficult to manufacture. Another drawback is that a monocoque chassis generally has to be designed and produced in accordance with the exact specifications of the final vehicle. This implies that even minor redesigns of the vehicle can result in a complete and complex redesign of the chassis. This is troublesome since monocoque chassis must be formed as a single entity while oftentimes using highly specific and expensive tools.

EP 3 538 423 B1 discloses how a different type of chassis can be formed by connecting plate type elements to each other by coupling elements. It is further disclosed how other components of the vehicle can be connected to the coupling elements. Such a chassis is efficient, strong, lightweight and moreover adaptable to some extent since e.g. coupling elements exhibiting different characteristics can be used in the chassis. For instance, the size and shape of coupling elements may be varied to suit different needs. However, the connection of other components of the vehicle to the coupling elements involve a risk of misplacement as well as a reduced overall strength of the chassis. For instance, if a component of the vehicle is mounted to a coupling element by drilling a hole in the coupling element and bolting the component to the coupling element using the hole, there is a risk of a misplacement of the hole which will result in a misplacement of the component at hand. Moreover, by drilling a hole in the coupling element, the strength of the coupling element will be reduced to some extent. The strength of the coupling element may risk becoming even more reduced as more components are attached thereto.

Hence, there exists a need for a more adaptable chassis which may be formed without compromising its strength.

SUMMARY OF INVENTION

In view of the above, it is an object of the present invention to provide an improved chassis for a vehicle and an improved method for forming a chassis for a vehicle.

Another object is to provide such a chassis which offers an increased adaptability.

Another object is to provide such a method which offers an increased adaptability.

Another object is to provide such a chassis which offers an increased strength.

Another object is to provide such a chassis which offers an increased strength irrespective of the attachment of components of the vehicle.

Another object is to provide such a chassis which is less time consuming to form.

Another object is to provide such a chassis which is less prone to errors when being formed.

Another object is to provide such a chassis which requires fewer tools when being formed.

Another object is to provide such a chassis which requires less complex tools when being formed.

Another object is to provide such a method which reduces the time used for forming a chassis.

It is also an object to provide a cost-effective chassis and method.

To achieve at least one of the above objects and also other objects that will be evident from the following description, a chassis for a vehicle having the features defined in claim 1 is provided according to the present inventive concept. A method for forming a chassis for a vehicle is provided according to claim 15. Preferred variations to the inventive concept will be evident from the dependent claims.

More specifically, according to a first aspect, there is provided a chassis for a vehicle, the chassis comprising a plurality of sandwich plate elements and a plurality of connection elements for connecting said plurality of sandwich plate elements, wherein, the sandwich plate elements each comprise a plate core and a first and second plate skin, wherein the first plate skin is arranged to at least partly cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being opposite to each other, and wherein; each connection element comprises two or more recesses, each recess comprising a first and a second inner surface and being configured to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess, and wherein the plurality of connection elements comprises at least one connection element which has at least one external surface provided with a connection configuration for a mortise and tenon type joint.

Hereby an improved chassis for a vehicle is provided.

The chassis comprises sandwich plate elements and connection elements which together form the chassis. The chassis may however include further components apart from the sandwich plate elements and the connection elements. Each sandwich plate element generally includes a plate core sandwiched between plate skins. The plate skins are generally formed of a material exhibiting a high material strength. In this way, the plate skins will typically contribute the overall strength of the sandwich plate elements to a high degree. The plate core is generally formed of a material exhibiting a lower material strength as compared to the plate skins. The plate core is generally formed of a material exhibiting a lower density as compared to the plate skins. By this plate configuration, the plate core ensures that the plate skins are kept at a desired distance from each other, i.e. the thickness of the plate, irrespective of if the sandwich plate is subjected to forces, such as bending forces. A sandwich plate element of the above kind is generally a high strength and lightweight plate element which may be used to advantage in a chassis for a vehicle. However, different characteristics of the plate skins and the core may be used to advantage, e.g. to tailor the sandwich plate elements to suit specific needs. For instance, the sandwich plate elements may include any number of material layers. For instance, the sandwich plate elements may include a plurality of material layers of different materials and/or thicknesses.

The fact that the first and second inner surface of each recess interacting with the sandwich plate elements enables a rigid construction with an efficient transfer of forces. More specifically, the fact that the first and second inner surface of each recess interacting with the plate skins enables a rigid construction with an efficient transfer of forces. This allows for formation or construction of a chassis with a high degree of safety and good vehicle handling characteristics. At the same time, it becomes possible to transport and/or handle the chassis in its disassembled state. Moreover, the parts of the chassis may be formed more cheaply and with simpler tools as compared to when forming a whole chassis, such as a monocoque chassis, while still maintaining good stiffness characteristics.

At least one connection element of the connection elements included in the chassis has at least one external surface provided with a connection configuration for a mortise and tenon type joint. A plurality of connection elements of the connection elements included in the chassis may have at least one external surface provided with a connection configuration for a mortise and tenon type joint. All connection elements of the connection elements included in the chassis may have at least one external surface provided with a connection configuration for a mortise and tenon type joint.

More than one external surface of a connection element included in the chassis may be provided with a connection configuration for a mortise and tenon type joint. More than one external surface of a plurality connection elements included in the chassis may be provided with a connection configuration for a mortise and tenon type joint. More than one external surface of all connection elements included in the chassis may be provided with a connection configuration for a mortise and tenon type joint.

It should be noted that within the context of this application the term "connection configuration for a mortise and tenon type joint" may be any type of pattern or structure capable of being included in a joint of mortise and tenon type. The connection configuration may be external to and hence protrude from the external surface of the at least one connection element. The connection configuration may be internal of and hence not protrude from the external surface of the at least one connection element. The connection configuration may form part of or form the complete external surface of the at least one connection element.

It should be noted that within the context of this application the term "mortise and tenon type joint" may be any type of joint including any type of mortise and any type tenon interacting with each other. The mortise may be any type of opening, hole, recess, slot or similar. The mortise may have any suitable shape. The tenon may be any type of protrusion, projection, pin, track or similar. The tenon may have any suitable shape. The mortise and tenon of the mortise and tenon type joint are formed such that they can interact with each other in the sense that they may transfer forces between each other. The mortise and tenon may interact partially or completely with each other. The mortise and tenon may interact with each other while exhibiting a tight fit. The mortise and tenon may interact while exhibiting a loose fit capable of transferring forces therebetween.

The mortise and tenon type joint which may be formed by the connection configuration may be a dovetail joint. Hence, the connection configuration may include a least one so-called pin and/or at least one so-called tail configured to form a dovetail joint. The connection configuration may include a plurality of so-called pins and/or a plurality of so-called tails configured to form a dovetail joint. The connection configuration may include a plurality of so-called pins and/or a plurality of so-called tails configured to form a plurality of dovetail joints.

The connection configuration may be configured to form a straight and/or mitred mortise and tenon type joint.

The connection configuration may be configured to form a sliding type mortise and tenon type joint.

By having at least one connection element which has at least one external surface provided with a connection configuration for a mortise and tenon type joint, it is enabled that additional components, also referred to as auxiliary elements, may be connected to the at least one connection element without having to modify or adapt the at least one connection element. Hence, additional components or auxiliary elements may be connected to the at least one connection element without compromising its structural integrity. Further, a plurality of additional components or auxiliary elements may be connected to the at least one connection element without compromising its structural integrity. Further, a single one or a plurality of additional components or auxiliary elements may be connected to the at least one connection element in a number of different ways without compromising the structural integrity of the at least one connection element. Further, a single one or a plurality of additional components or auxiliary elements may be connected to the at least one connection element without using tools.

The connection configuration may comprise a slot of mortise type and/or a projection of tenon type which is advantageous in that a reliable and strong connection may be achieved between the at least one connection element and e.g. an additional component or auxiliary element. As such, an additional component or auxiliary element may be slid into and received by a slot of mortise type of the connection configuration. Correspondingly, an additional component or auxiliary element may be slid over a projection of tenon type of the connection configuration. Further, an additional component or auxiliary element may be slid into and received by a slot of mortise type of the connection configuration and simultaneously be slid over a projection of tenon type of the connection configuration.

The slot and/or projection may have a straight extension along the at least one external surface of said at least one connection element which is advantageous in that a sliding engagement of an additional component or auxiliary element may be facilitated. Further by letting the slot and/or projection have a straight extension along the at least one external surface of said at least one connection element, extrusion of the at least one connection element is enabled or at least facilitated which is advantageous in that at least one connection element may be formed in an efficient and yet simple manner.

The connection configuration may comprise a plurality of slots of mortise type and/or projections of tenon type extending in parallel, which is advantageous in that a stronger connection to an additional component or auxiliary element may be achieved. Further by a having a connection configuration having a plurality of slots of mortise type and/or projections of tenon type extending in parallel may result in that an increased adaptability may be achieved since a single or plurality of additional components or auxiliary elements may be connected to the at least one connection element in a plurality of ways, hence an increased adaptability may be achieved.

The chassis may further comprise at least one auxiliary element which is connectable to the at least one connection element by means of an outer surface which is provided with an auxiliary element connection configuration which is complementary to the connection configuration of the at least one connection element, which is advantageous in the at least one auxiliary element may be connected to the other parts of the chassis in a reliable, strong and yet simple manner. Further, by letting the chassis comprise at least one auxiliary element brings about the advantage of enabling the chassis to include features increasing the safety, handling or other features of the chassis.

The fact that the at least one auxiliary element is connectable to the at least one connection element by means of an outer surface which is provided with an auxiliary element connection configuration which is complementary to the connection configuration of the at least one connection element brings about that a strong and rigid connection may be achieved between the connection element and the auxiliary element at hand.

The fact that the auxiliary element connection configuration is complementary to the connection configuration of the at least one connection element brings about that a tight fit or a fit with a limited slack may be achieved.

It should be noted that within the context of this application the term "complementary to" may refer to any auxiliary element connection configuration which is complementary to at least a portion of the connection configuration of the at least one connection element.

It should be noted that within the context of this application the term "complementary to" may refer to any connection configuration of the at least one connection element which is complementary to at least a portion of the auxiliary element connection configuration.

Hence, the auxiliary element connection configuration may have smaller or a larger surface than the connection configuration of the at least one connection element.

An auxiliary element may be a single element forming a dedicated purpose in the chassis. An auxiliary element may include a plurality of parts together forming a dedicated purpose in the chassis. An auxiliary element may be an element forming part of an element configuration forming a dedicated purpose in the chassis. In other words.

Examples of auxiliary elements may be wheel suspensions, fuel tanks, lights, engine mounts, seats, radiators, roofing, body components, rear-view mirrors, seat belts, battery mounts, impact protection elements, energy absorption elements, towing connectors, external luggage compartments, accelerator pedal mount, brake pedal mount, steering wheel assembly, steering gear assembly, coupling elements or other elements necessary for the functionality of a vehicle.

The auxiliary element connection configuration may be configured for cooperation with a single slot or projection of the connection configuration of the at least one connection element, which is advantageous in that an auxiliary element may be connected to the at least one connection element with an increased adaptability. Hence, a relatively speaking small element may be attached to a single slot or projection of the connection configuration of the at least one connection element, wherein the connection configuration as such may include a plurality of slots or projections. In other words, an auxiliary element connection configuration configured for cooperation with a single slot or projection of the connection configuration of the at least one connection element may result in that the auxiliary element may be connected to the connection configuration of the at least one connection element in a plurality of ways.

The auxiliary element connection configuration may be configured for cooperation with a plurality of slots and/or projections of the connection configuration of the at least one connection element, which is advantageous in that a strong and yet adaptable connection may be achieved.

The at least one auxiliary element may be a coupling element for attachment of an additional element to the chassis, which is advantageous in that additional elements of various types may be attached in a strong adaptable manner to the chassis. Moreover, additional elements of various types may be attached to the chassis without reducing the strength of the coupling elements used in the chassis. The additional elements may be further auxiliary elements.

A single auxiliary element in the form of a coupling element may be used for attachment of a single additional element to the chassis. A single auxiliary element in the form of a coupling element may be used for attachment of a plurality of additional elements to the chassis. A plurality of auxiliary elements in the form of coupling elements may be used for attachment of a single additional element to the chassis. A plurality of auxiliary elements in the form of coupling elements may be used for attachment of a plurality of additional elements to the chassis.

The additional element may be a functional element adding functionality to the chassis and/or the vehicle.

The connection configuration and/or the auxiliary element connection configuration may comprise a projection of tenon type which is provided with a groove extending in a longitudinal direction of the projection and configured to receive a locking member, which is advantageous in that auxiliary element may be locked in relation to the connection element by providing a locking member in the groove.

The groove extending in a longitudinal direction may form a hole in the longitudinal direction when the connection configuration and the auxiliary element connection configuration cooperate with each other. The groove and consequently the so formed hole may be configured to receive a locking member. In a variant, the locking member may be a screw which is screwed into a hole at least partially defined by the groove. The threads of the screw may then engage the material of the connection configuration and the auxiliary element connection configuration thereby locking the auxiliary element in relation to the connection element.

The locking member may be a pin, a partially threaded member, a barbed member, a wedge shape member, a partially wedge shape member, a flexible member exhibiting a pressure when inserted into the groove or similar.

A connection element may be made of metal. Metal is widely available, strong and is typically easy to manufacture high strength parts from. A connection element may be made of aluminium.

A connection element may be made of extruded aluminium.

A connection element may be made by an extrusion process. By such a process it is possible to more easily form a strong connection element which may have a complicated cross-section.

A connection element may be made of a polymeric material.

A connection element may be made of a fibre reinforced polymeric material. Said fibre may include glass fibre, cellulose fibre, polymer fibre, carbon fibre textile fibre and/or metal fibre.

A connection element may be made from a polymer-based material. Polymer-based materials are cheap to manufacture, strong and may be easy to shape. Both connection elements made of metal and polymer-based materials may suitably be formed by 3d printing techniques.

The first and second plate skin of a sandwich plate element may be made from a fibre-reinforced polymer material, which is advantageous in that the strong and lightweight sandwich plate element may be achieved.

The first and second plate skin of a sandwich plate element may be made from metal.

The first and second plate skin of a sandwich plate element may be made from a polymeric material.

The plate core of a sandwich plate element may be made from a polymeric foam, which is advantageous in that a strong and lightweight sandwich plate element may be achieved. Polymeric foam may absorb impacts and may be lightweight. The plate core may increase the thickness of the sandwich plate element thereby increasing bending stiffness while only marginally increasing the weight of the sandwich plate element.

Moreover, the use of a polymeric foam core may facilitate the forming of the sandwich plate elements by shaping the polymeric foam into a desired shape and subsequently forming the plate skins on the formed core. In other words, the core may be formed into a desired shape and the skins may be laminated on the core such that the skins follow an external contour of the core.

The plate core of a sandwich plate element may be made of wood.

The plate core of a sandwich plate element may be made of a material having a honeycomb structure.

The edge portions received in the recesses may be bonded to the first and second inner surfaces of said recesses by an adhesive, which is advantageous in that a strong connection may be achieved. Moreover, the use of an adhesive provides a way to attach the sandwich plate elements to the connection elements without for example making holes, which otherwise may compromise the rigidity of the chassis, or make unnecessary additions to the sandwich plate elements or connection elements. In other words, by bonding the edge portions of the sandwich plate elements to the inner surfaces of the respective recesses the mechanical properties of the sandwich plate elements and the connection elements may be less affected as compared to when mechanical fastening techniques are used.

The first and second major outer surfaces of the sandwich plate elements may be at least partially parallel. By having at least the edge portions of the sandwich plate elements received in the connection elements parallel may make the chassis stronger. For instance, tensions in the plate elements as a result of bending of said plate elements may be distributed in the skin of the sandwich plate elements and further into the connection elements.

The chassis may further comprise energy absorption elements. Such energy absorption elements may increase safety for passengers in a vehicle comprising the chassis as they may at least partly absorb the energy of an impact from a collision.

The energy absorption elements may be arranged at least partially at a front and/or a back of the chassis. They may then absorb energy from frontal and rear vehicle collisions. As an example, this may prevent whiplash injuries or other severe injury types.

The energy absorption elements may be arranged at least partially at a left and/or a right side of the chassis. This may provide protection from vehicle collisions for example when crossing a road lane.

According to another aspect of the invention, there is provided a method for forming a chassis for a vehicle, the method comprising: providing a plurality of sandwich plate elements, each plate element comprising a plate core and a first and second plate skin, wherein the first plate skin is arranged to at least partly cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being opposite to each other, providing a plurality of connection elements, each connection element comprising two or more recesses, each recess comprising a first and a second inner surface and being configured to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess, wherein the plurality of connection elements comprises at least one connection element which has at least one external surface provided with a connection configuration for a mortise and tenon type joint, providing at least one auxiliary element which has an outer surface which is provided with an auxiliary element connection configuration which is complementary to the connection configuration of the at least one connection element, arranging an edge portion of each of the plurality of sandwich plate elements into a recess of one of the plurality of connection elements, and connecting the at least one auxiliary element to the at least one connection element by means of the auxiliary element connection configuration and the connection configuration of the at least one connection element.

In general, features of this aspect of the invention provide similar advantages as discussed above in relation to the previous aspect of the invention. Consequently, said advantages will not be repeated in order to avoid undue repetition. Hence, the details and advantages of this aspect of the invention are largely analogous to those of the first aspect of the invention, wherein reference is made to the above.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise.

BRIEF DESCRIPTION OF THE DRAWINGS

The above, as well as additional objects, features and advantages of the present invention, will be better understood through the following illustrative and non-limiting detailed description of preferred variants of the present inventive concept, with reference to the appended drawings, where the same reference numerals will be used for similar elements, wherein.

DETAILED DESCRIPTION

Figure 1:
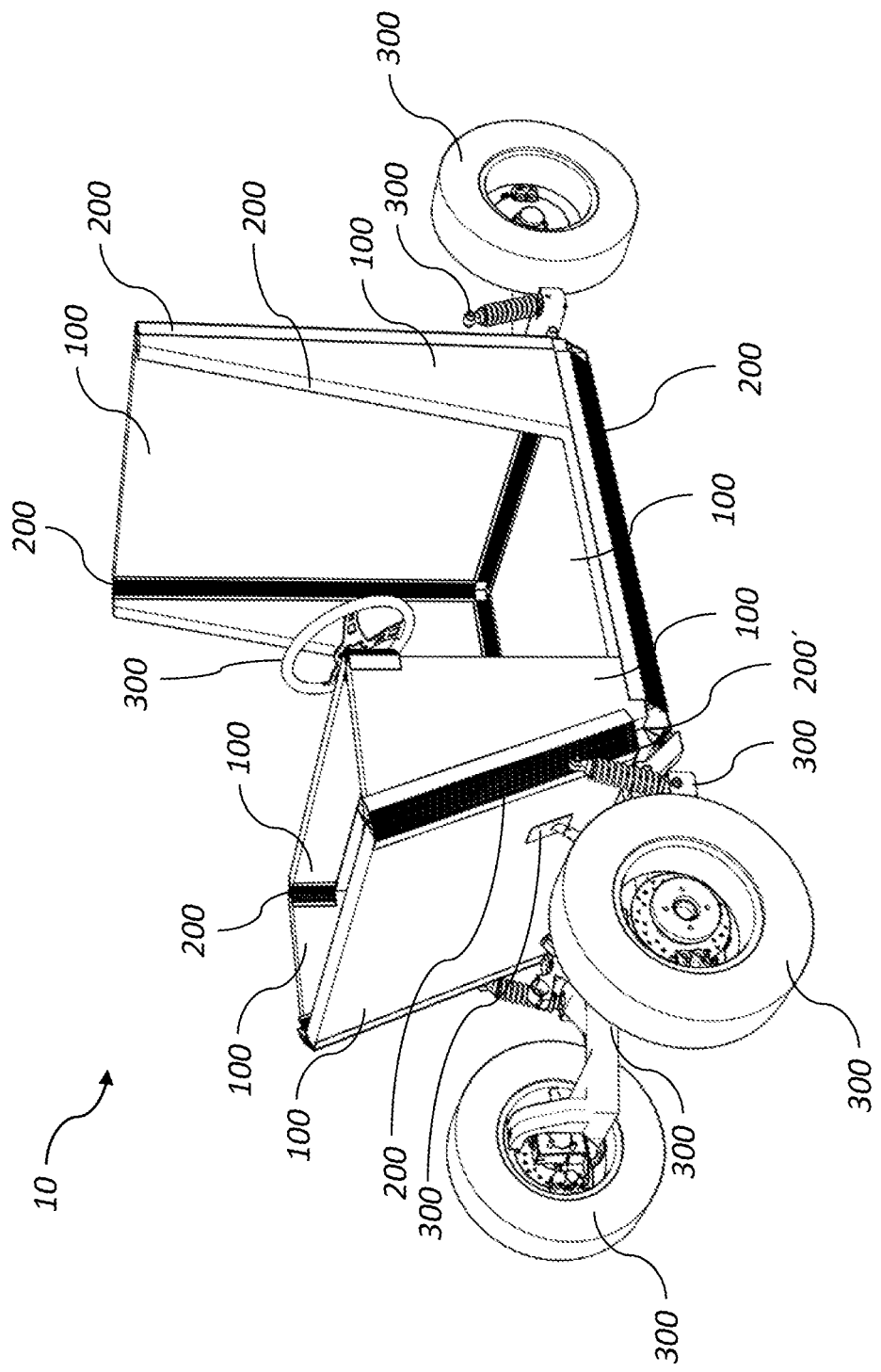
FIG. 1 conceptually illustrates a chassis for a vehicle.

The present inventive concept will now be described more fully hereinafter with reference to the accompanying drawings, in which preferred variants of the inventive concept are shown. This inventive concept may, however, be embodied in many different forms and should not be construed as limited to the variants set forth herein; rather, these variants are provided for thoroughness and completeness, and fully convey the scope of the inventive concept to the skilled person. Like reference numerals refer to like elements throughout the description.

Initially a chassis 10 for a vehicle will be briefly described with reference to FIG. 1. Followingly, the general concept of connecting sandwich plate elements 100 to each other by means of connection elements 200 used in the chassis 10 will be described with reference to FIGS. 2 and 3. Followingly, several variants and details of the chassis 10 will be described with reference to FIGS. 4-11.

FIG. 1 is a schematic perspective view conceptually depicting a chassis for a vehicle 10. The chassis 10 comprises a plurality of sandwich plate elements 100 and a plurality of connection elements 200 for connecting said plurality of sandwich plate elements 100. The chassis 10 further comprises auxiliary elements 300. The schematically depicted auxiliary elements 300, in form of e.g. wheel suspension, wheels, a steering wheel and a steering array are shown in FIG. 1 to more clearly illustrate the design and functionality of the chassis 10.

Figure 2:
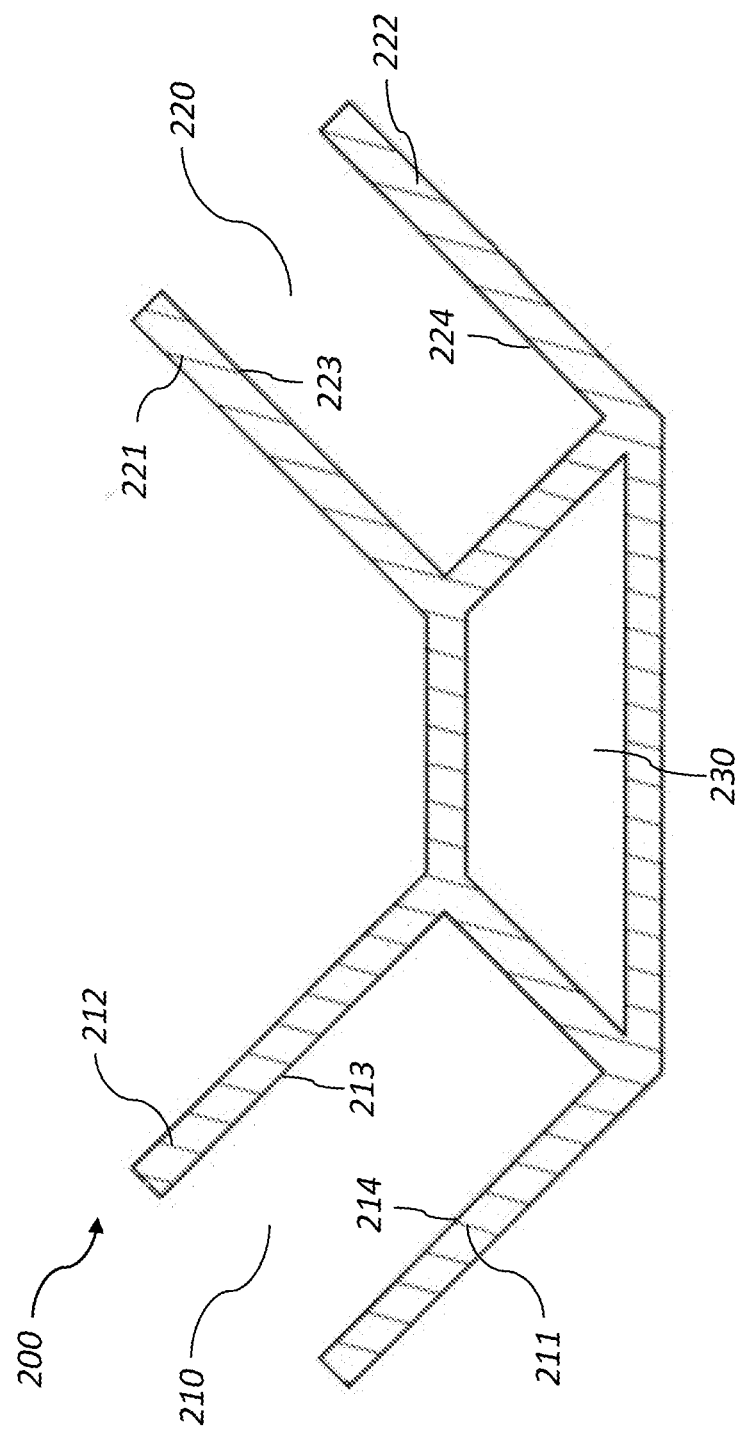
FIG. 2 is a cross sectional view of a generic connection element.

Now referring to FIG. 2, here is conceptually depicted a general design of connection element 200 which may be used to connect sandwich plate elements 100 in the chassis 10 of FIG. 1. The connection element 200 comprises two recesses 210, 220 formed of flanges 211, 212, 221, 222. The recesses 210, 220 are in this case symmetrically formed with respect to each other. Each of the two recesses 210, 220 comprises a first and second inner surface 213, 214, 223, 224. The connection element 200 comprises a central portion 230 having a trapezoid shape. The central portion 230 serves to stabilize the flanges 211, 212, 221, 222 against outer forces and to transfer forces between plate elements 100 received in the connection element 200 or auxiliary elements 300. The connection element 200 is depicted as having a right angle between the flanges 211 and 221, and between the flanges 212, 222. It is not necessary to have the flanges 211, 212, 221, 222 define a right angle, and the angle may instead be any desired angle depending on the needs. The connection element 200 depicted in FIG. 2 is made of extruded aluminium. As an alternative, the connection element 200 may be made of a different metal such as steel, iron, or a combination thereof.

Other suitable manufacturing techniques such as 3d printing, pultrusion or pullwinding may be used as an alternative to an extrusion process. The connection element 200 may be made from sheet metal or similar. Moreover, the connection element 200 may be made of polymer-based material, such as acrylic, PET, polypropylene, polycarbonate, acrylonitrile butadiene styrene, polyethylene, polystyrene, polyamide vinyl ester-based materials, lignin or epoxy. The polymer-based material may advantageously be reinforced by fibres such as flax fibres, thermoplastic fibres, carbon fibres, glass fibres, cotton fibres, hemp fibres, metal fibres, plastic fibres or any other sufficiently strong fibrous material, or a combination thereof.

Figure 3:
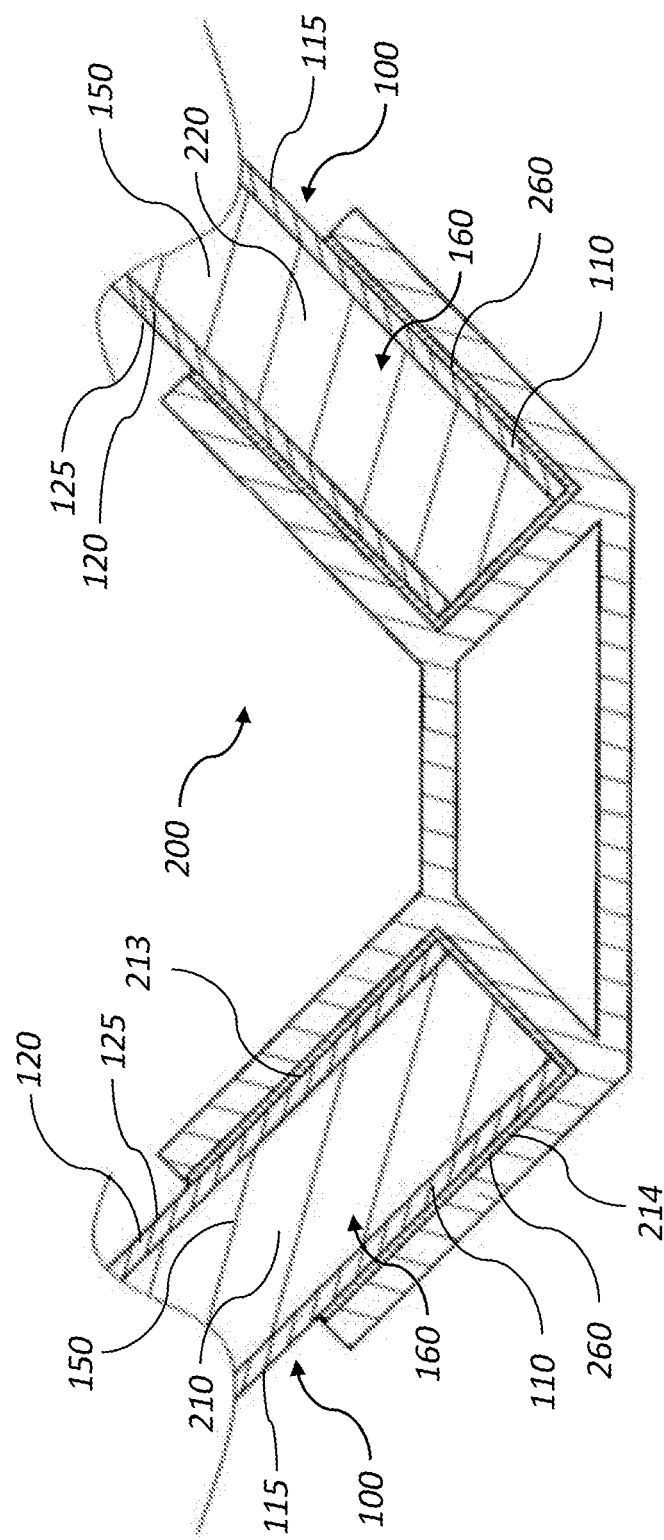
FIG. 3 is a cross sectional view of the generic connection element of FIG. 2 with sandwich plate elements attached.

Now referring to FIG. 3, here is conceptually depicted how two sandwich plate elements 100 are connected to each other by means of the connection element 200 depicted in FIG. 2. More specifically, FIG. 3 illustrates a cross-section of the connection element 200 of FIG. 2 with a sandwich plate element 100 being received in the recess 210 of the connection element 200 and a sandwich plate element 100 being received in the recess 220 of the connection element 200.

Each sandwich plate element 100 comprises a plate core 150, a first plate skin 110 and a second plate skin 120. The first plate skin 110 is arranged to at least partly cover a first major surface of the plate core 150, thereby forming a first major outer surface 115 of the sandwich plate element 100. The second plate skin 120 is arranged to at least partially cover a second major surface of the plate core 150 thereby forming a second major outer surface 125 of the sandwich plate element. The first and second major outer surfaces 115, 125 are opposite to each other. The first and second plate skins 110, 120 are attached to the plate core 150, and cover the plate core 150 as seen along a normal direction of the first or second plate skin 110, 120. The first and second plate skins 110, 120 each have a respective major outer surface 115, 125. The sandwich plate element 100 comprises an edge portion 160 at each of its edges.

In the depicted sandwich plate element 100, the plate core 150 is made of a polymeric foam in the form of polystyrene foam. In the depicted sandwich plate element 100, the first and second plate skins 110, 120 are made of a fibre-reinforced polymer material in form of glass fibre reinforced polyester resin. In other words, the depicted first and second plate skins 110, 120 are made of glass fibres in cured polyester resin. The first and second plate skins 110, 120 are bonded to the plate core 150 using an adhesive. Examples of suitable adhesives are multi-component adhesives such as polyester/polyurethane resin, a polyol/polyurethane resin or an acrylic/polyurethane resin. Other examples may include epoxy, cyanoacrylate or silicone.

As an alternative the plate core 150 may be made of polyurethane, polypropylene, PET or a combination of polyurethane and polystyrene foam. As an alternative the plate core 150 may be made of wood, such as solid wood or laminated veneer lumber, LVL. As an alternative the plate core 150 may be made of a honeycomb material structure.

Further, the first and second plate skins 110, 120 may alternatively be made of sheet metal, polymer-based materials, such as acrylic, PET, polypropylene, polycarbonate, acrylonitrile butadiene styrene, polyethylene, polystyrene, polyamide, vinyl ester-based materials, lignin, epoxy or a combination thereof. The first and second plate skins 110, 120 may be reinforced by fibres. Examples of suitable fibres are: flax fibres, thermoplastic fibres, carbon fibres, glass fibres, cotton fibres, hemp fibres, metal fibres and plastic fibres. The first and second plate skins 110, 120 may be made of different materials.

The sandwich plate elements 100, may have a thickness in the range of about 2.5 cm to about 15 cm. Other thicknesses may be used to advantage and to suit specific needs.

As is depicted in FIG. 3, the first and second inner surfaces 213, 214 interact with the edge portion 160 of the sandwich plate element 100, counteracting movement of the sandwich plate element 100 in directions normal to the first and second major outer surfaces 115, 125. The first and second inner surfaces 213, 214 are bonded to the sandwich plate element 100 by an adhesive 260, such as epoxy. The adhesive 260 may be applied to the sandwich plate element 100 before insertion of the sandwich plate element 100 into the recess 210. It may also be applied to the connection element 200 before insertion of the sandwich plate element 100 or to both the sandwich plate element 100 and the connection element 200 before insertion of the sandwich plate element 100. As an alternative, an adhesive 260 may be applied after insertion of the sandwich plate element 100 into the connection element 200 by way of injection into pre-formed grooves the flanges 211, 212, 221, 222. In FIG. 3, the first and second major outer surfaces 115, 125 are parallel to each other. Further, as shown in FIG. 3, a sandwich plate element 100 has been received in a corresponding manner in recess 220.

Figure 4:
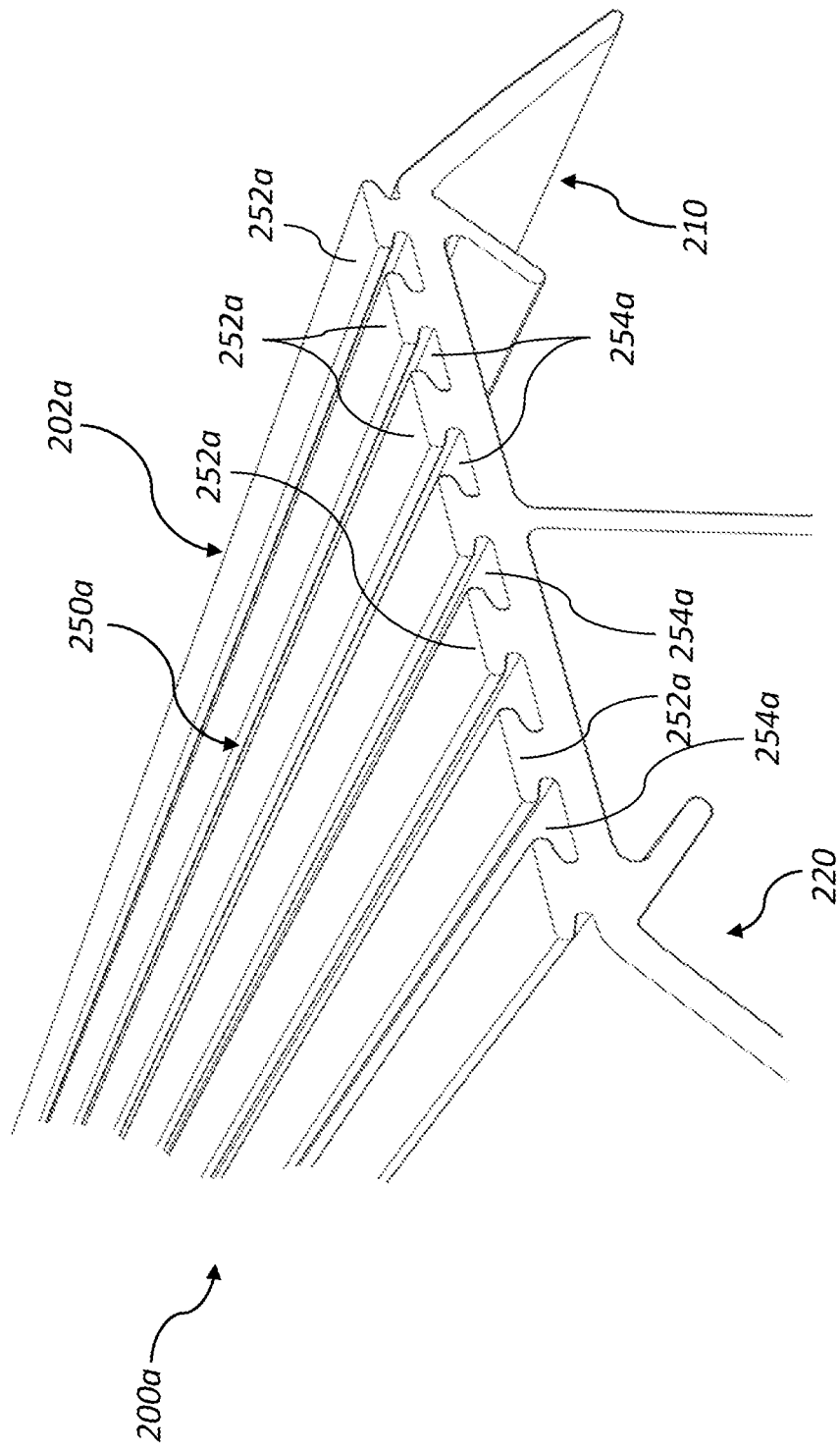
FIG. 4 is a perspective detail view of a connection element.

Now referring to FIG. 4, here is conceptually depicted a portion of a connection element 200a which may be used in the chassis 10 of FIG. 1. The overall functionality of the connection element 200a corresponds to the functionality of the connection element 200 discussed above in conjunction with FIGS. 2 and 3. The general design of the connection element 200a and how the recesses 210, 220 thereof is used to hold sandwich plate elements 100 will not be discussed again to avoid undue repetition. The location of two recesses 210, 220 are indicated in FIG. 4 although the complete extent of the recesses 210, 220 are not shown since FIG. 4 is a detail view of the connection element 200a. In the following, differences to the in relation to the connection element 200 discussed above in conjunction with FIGS. 2 and 3 will consequently be discussed.

The connection element 200a of FIG. 4 has an external surface 202a which is provided with a connection configuration 250a for a mortise and tenon type joint.

As can be seen in FIG. 4, the connection configuration 250a comprises a plurality of projections 252a of tenon type. A plurality of slots 254a of mortise type are formed between the projections 252a. As is seen, in the depicted connection configuration 250a a slot 254a of mortise type is formed between two adjacent projections 252a.

As can be seen in FIG. 4 the slots 254a have a straight extension along the external surface 202a of the connection element 200a.

As can be seen in FIG. 4 the projections 252a have a straight extension along the external surface 202a of the connection element 200a.

The slots 254a and the projections 252a extend in parallel along the external surface 202a of the connection element 200a. The straight parallel extension of the slots 254a and the projections 252a allow for a sliding engagement of for instance an auxiliary element 300.

The depicted connection element 202a of FIG. 4 is formed by extruded aluminium. Other materials may however be used to advantage as discussed above in conjunction with FIG. 2.

Although the connection configuration 250a of FIG. 4 has been depicted with a plurality of slots 254a and projections 252a the connection configuration 250a may likewise be formed with a single slot 254a and/or a single projection 252a.

Figure 5:
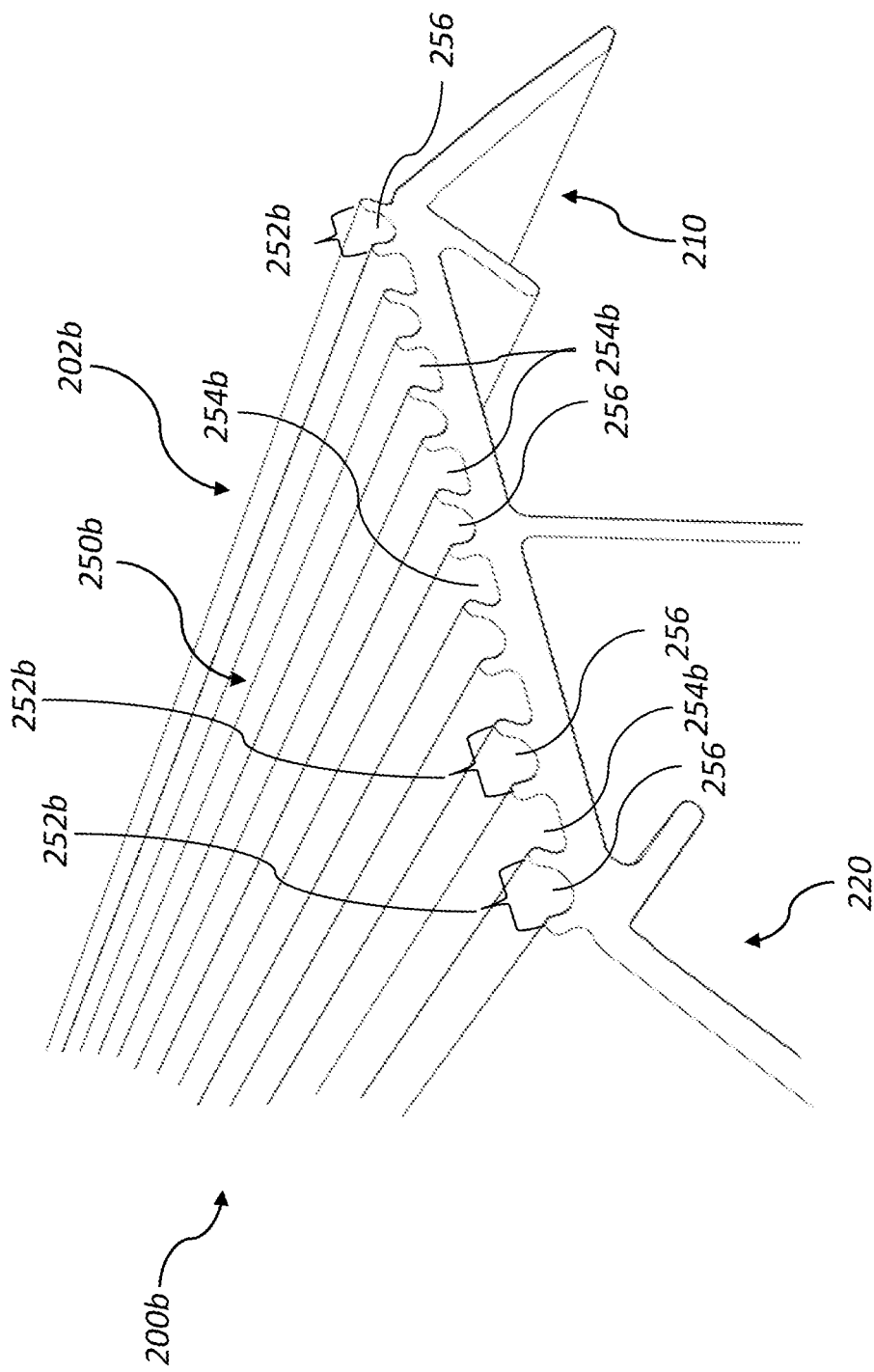
FIG. 5 is a perspective detail view of a connection element.

Now referring to FIG. 5, here is conceptually depicted a portion of a connection element 200b which may be used in the chassis 10 of FIG. 1. The overall functionality of the connection element 200b corresponds to the functionality of the connection element 200 discussed above in conjunction with FIGS. 2 and 3. The general design of the connection element 200b and how the recesses thereof is used to hold sandwich plate elements 100 will not be discussed again to avoid undue repetition. The location of two recesses 210, 220 are indicated in FIG. 5 although the complete extent of the recesses 210, 220 are not shown since FIG. 5 is a detail view of the connection element 200b. In the following, differences to the in relation to the connection element 200 discussed above in conjunction with FIGS. 2 and 3 will consequently be discussed.

The connection element 200b of FIG. 5 is similar to the connection element 200a of FIG. 4. Hence the connection element 200b of FIG. 5 has an external surface 202b which is provided with a connection configuration 250b for a mortise and tenon type joint. However, the connection configuration 250b of FIG. 5 has a different design as compared to the connection configuration 250a of FIG. 4. The connection configuration 250b comprises a plurality of projections 252b of tenon type. A plurality of slots 254b of mortise type are formed between the projections 252b. As is seen, in the depicted connection configuration 250b a slot 254b of mortise type is formed between two adjacent projections 252b. However, each projection 252b of the connection configuration 250b includes a groove 256. The groove 256 of each projection 252b is extending in a longitudinal direction of the respective projection 252b. As can be seen in FIG. 5, the groove 256 divides the respective projection 252b into two sub-projections which are joined at their bases. Those sub-projections are however forming part of a common projection 252b of tenon type as indicated by brackets in FIG. 5.

In FIG. 5 it is depicted that each projection 252b includes a groove 256. However, any number of projections 252b may include a groove 256. A single projection 252b may include a groove 256. All projections 252b may be void of grooves 256.

The grooves 256 of each projection 252b are configured to receive a locking member. This will be discussed in more detail below with reference to FIG. 6.

As can be seen in FIG. 5 the slots 254b have a straight extension along the external surface 202 of the connection element 200.

As can be seen in FIG. 5 the projections 252b have a straight extension along the external surface 202 of the connection element 200.

The slots 254b and the projections 252b extend in parallel along the external surface 202b of the connection element 200b. The straight parallel extension of the slots 254b and the projections 252b allow for a sliding engagement of for instance an auxiliary element 300.

Figure 6:
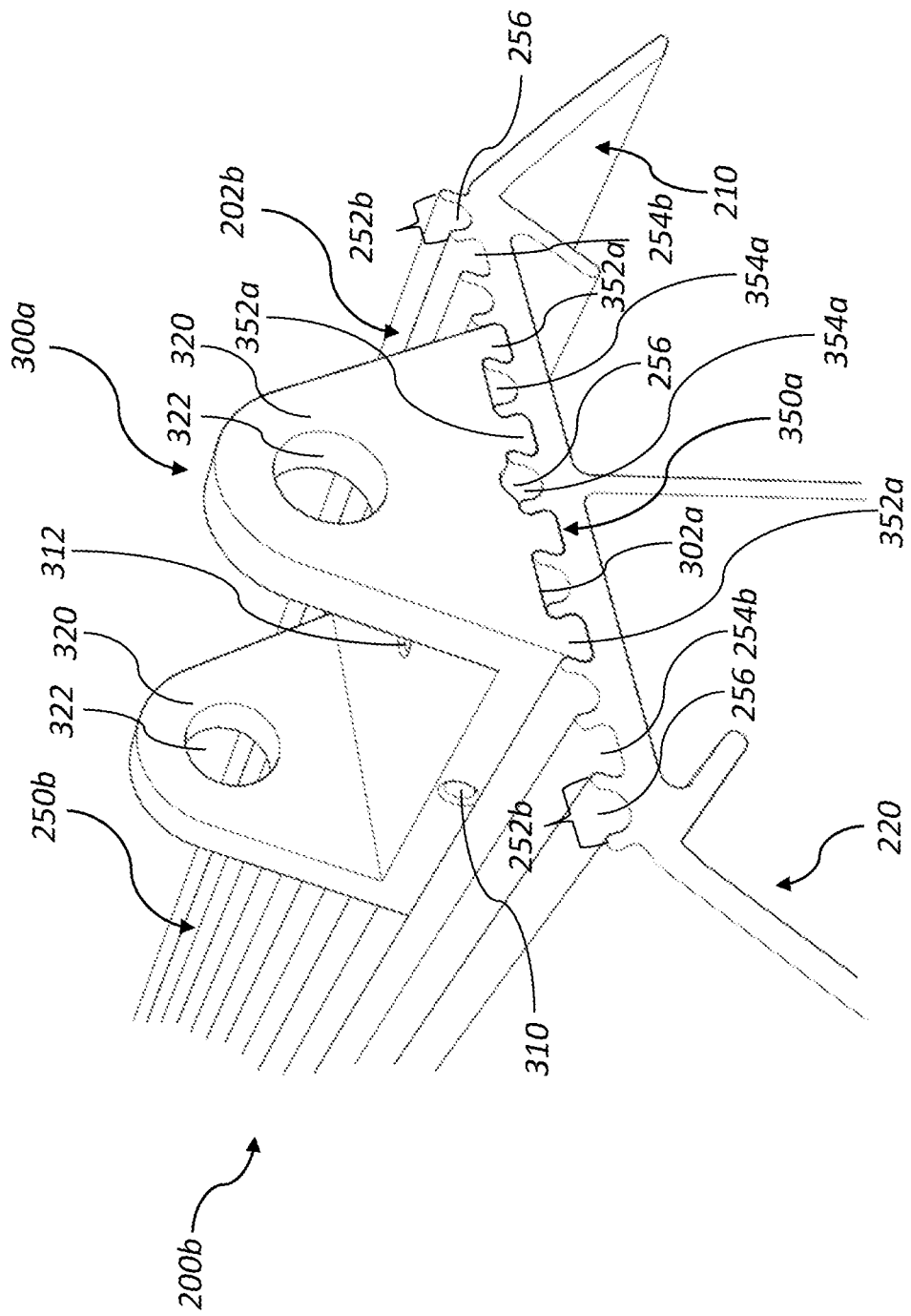
FIG. 6 is a perspective detail view of the connection element in FIG. 5 with an auxiliary element attached.

Now referring to FIG. 6, here is conceptually depicted how an auxiliary element 300a is connected to the connection element 200b depicted in FIG. 5. In order to be able to connect the auxiliary element 300a to the connection element 200b, the auxiliary element 300a is formed such that it is connectable to the connection element 200b. More specifically, the auxiliary element 300a is connectable to the connection element 200b by means of an outer surface 302a which is provided with an auxiliary element connection configuration 350a. In FIG. 6, the outer surface 302a which is provided with the auxiliary element connection configuration 350a is facing the outer surface 202b of connection element 202b and is therefore not visible although being indicated by reference numeral 302a at an edge thereof.

The auxiliary element connection configuration 350a is complementary to the connection configuration 250b of connection element 200b. Hence, auxiliary element connection configuration 350a is configured to engage connection configuration 250b of connection element 200b. Like connection configuration 250b of connection element 200b, the auxiliary element connection configuration 350a of auxiliary element 300a comprises a plurality of projections 352a of tenon type and a plurality of slots 354a of mortise type. The slots 354a are formed between the projections 352a. As is seen, in the depicted connection configuration 350a a slot 354a of mortise type is formed between two adjacent projections 352a of tenon type. The slots 354a of mortise type and projections 352a of tenon type are thus configured to engage slots 254b of mortise type and the projections 252b of tenon type so as to connect the auxiliary element 300a to the connection element 200b. The auxiliary element 300a is configured to be slid into the connection configuration 250b of the connection element 200b.

Hence, the auxiliary element connection configuration 350a is configured for cooperation with a plurality of slots 254b and projections 252b of the connection configuration 250b of the connection element 200b.

However, the auxiliary element connection configuration 350a may be configured for cooperation with a plurality of slots 254b or projections 252b of the connection configuration 250b of the connection element 200b.

Further, the auxiliary element connection configuration 350a may to advantage be configured for cooperation with a single slot 254b or projection 252b of the connection configuration 250b of the connection element 200b.

In order to lock the auxiliary element 300a with respect to the connection element 200b several strategies may be used. The connection configuration 250b of connection element 200b and the auxiliary element connection configuration 350a of the auxiliary element 300a may exhibit a tight fit such that the auxiliary element 300a is not easily slid along the connection configuration 250b of the connection element 200b.

In order to achieve a more reliable locking of the auxiliary element 300a with respect to the connection element 200b a mechanical locking may be provided.

As is depicted in FIG. 6, several alternatives for a mechanical locking may be utilized to advantage. As can be seen in FIG. 6, the centremost slot 354a of the auxiliary element 300a has been provided with a small indent coinciding with a groove 256 of the connection element 200b. The groove 256 is configured to receive a locking member so as to lock the auxiliary element 300a with respect to the connection element 200b. Several types of locking members may be used to advantage. A currently preferred variant of locking member is a screw. The screw acting as a locking member may hence be threaded into the groove such that the threads of the screw engages the material of the auxiliary element 300a and the connection element 200b thereby locking the auxiliary element 300a with respect to the connection element 200b. The screw may thus penetrate the material of auxiliary element 300a and the connection element 200b while forming threads therein.

Other locking members than a screw may be used to advantage in the groove 256, such as a pin, a barbed member or a wedge to give a few examples.

As an alternative or in addition to the groove, the auxiliary element 300a may be provided with one or more openings 310, 312 used for locking the auxiliary element 300a with respect to the connection element 200b. The depicted openings 310, 312 may be threaded at their internal surfaces and hence configured to receive a locking screw. The locking screw may thus be threaded into the openings thereby exhibiting a pressure on the connection element 200b and providing a pressure at the interface between the connection configuration 250b and the auxiliary element connection configuration 350. The locking screw may also penetrate the material of the connection element 200b to some extent. The auxiliary element 300a may be provided with a single opening 310, 312 or no opening 310, 312.

Another way to lock the auxiliary element 300a with respect to the connection element 200b is to use an adhesive at the interface between the connection configuration 250b and the auxiliary element connection configuration 350a. An adhesive may be used in combination with the above described ways of locking of the auxiliary element 300a with respect to the connection element 200b.

The depicted auxiliary element 300a includes two lugs 320 each provided with a through opening 322. The openings may be used to attach further components or auxiliary elements 300 to the auxiliary element 300a.

The auxiliary element 300a may hence function as a coupling element for 300a attachment of an additional element to the chassis.

The auxiliary element 300*a* may hence function as a coupling element for 300*a* attachment of an additional auxiliary element 300 to the chassis.

Figure 7:
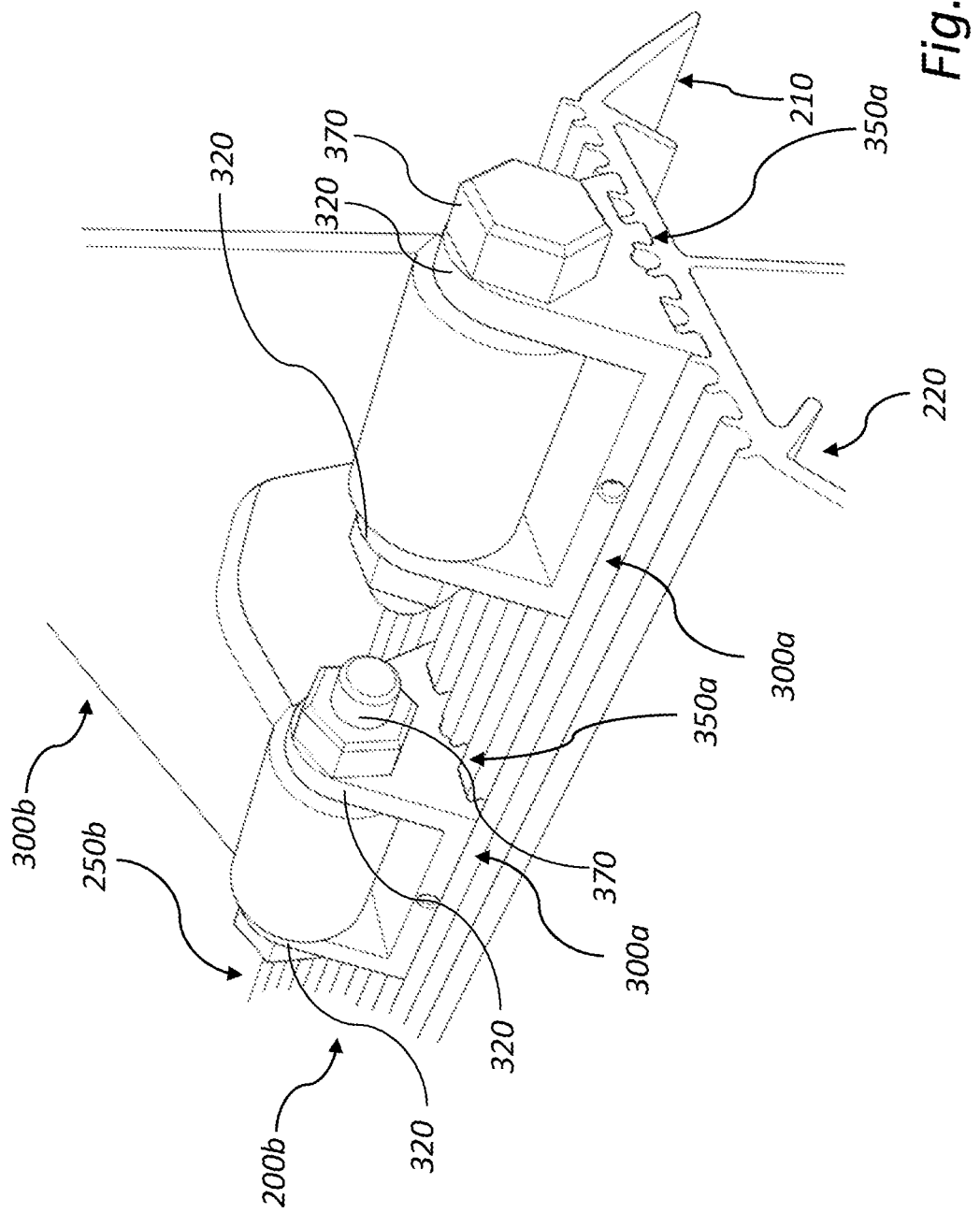
FIG. 7 is a perspective detail view of the connection element in FIG. 5 with auxiliary elements attached.

Now referring to FIG. 7, here is conceptually depicted how two auxiliary elements 300*a* of the type discussed more in detail above in conjunction to FIG. 6 are connected to the connection element 200*b*. As can be seen in FIG. 7, both auxiliary elements 300*a* are connected to the connection element 200*b* by means of their respective auxiliary element connection configuration 350*a*. The respective auxiliary element connection configuration 350*a* is hence cooperating with the connection configuration 250*b* of the connection element 200*b*. Each auxiliary element 300*a* is connected as described above in conjunction to FIG. 6.

Further, a further component or auxiliary element 300*b* is connected to the auxiliary elements 300*a* by means of a respective bolt 370 which is extending through the respective openings 322 of the lugs 320 of the auxiliary elements 300*a*. Hence the auxiliary element 300*b* is coupled to the connection elements 200*b* via the auxiliary elements 300*a*. The auxiliary elements 300*a* is jointly holding the auxiliary element 300*b*.

Figure 8:
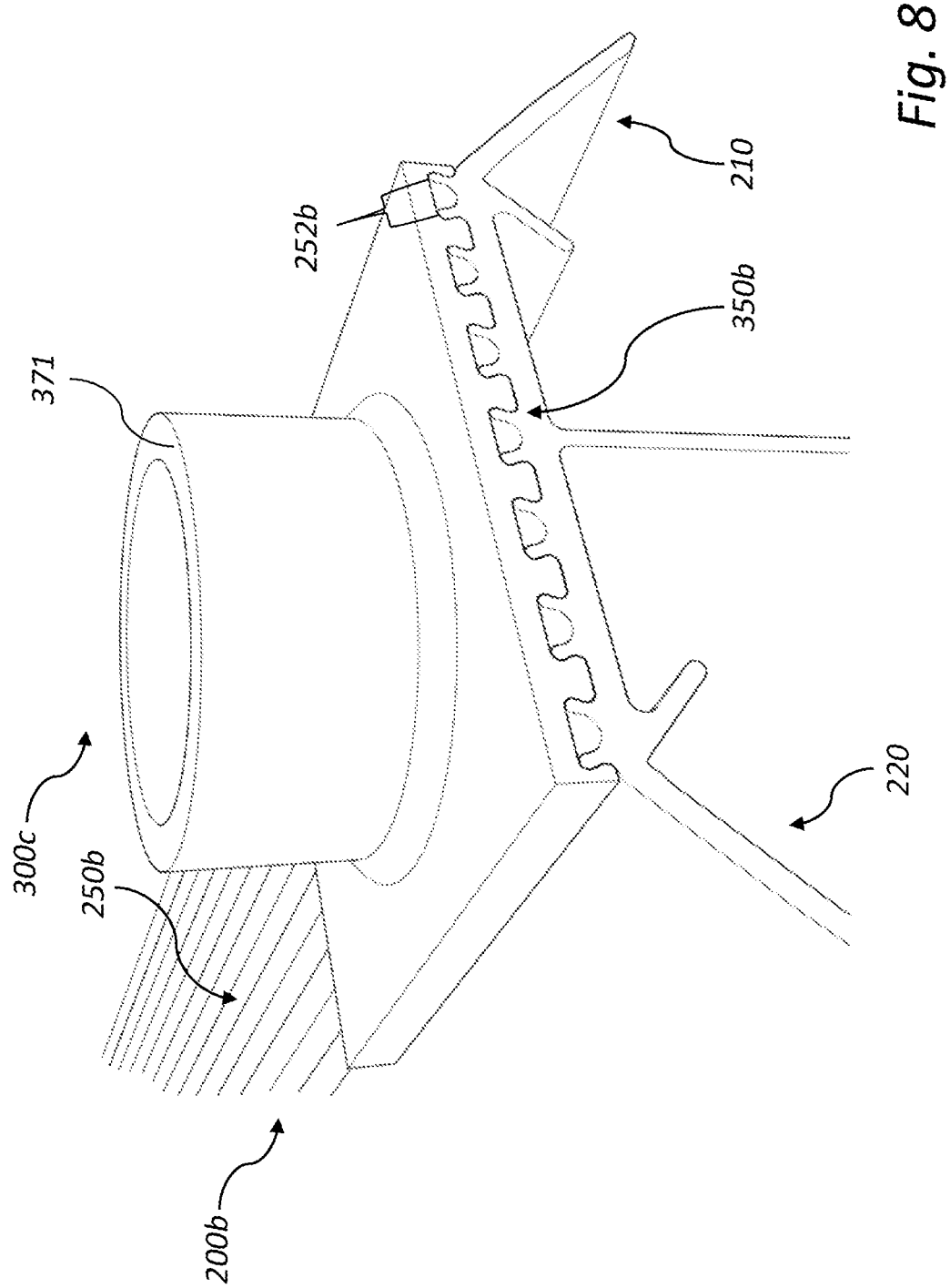
FIG. 8 is a perspective detail view of the connection element in FIG. 5 with an auxiliary element attached.

Now referring to FIG. 8, here is conceptually depicted how a relatively speaking large auxiliary element 300*c* is connected to the connection element 200*b*. The auxiliary element 300*c* includes a circular 371 seat to which further components or auxiliary elements may be connected. As can be seen in FIG. 8, the auxiliary element 300*c* is connected to the connection element 200*b* by means of the auxiliary element connection configuration 350*b* provided on the external bottom surface of the auxiliary element 300*c*. The auxiliary element connection configuration 350*b* is hence cooperating with the connection configuration 250*b* of the connection element 200*b*. The auxiliary element connection configuration 350*b* is similar to the auxiliary element connection configuration 350*a*. However, the auxiliary element connection configuration 350*b* is configured to engage all seven protrusions 252*b* of the connection configuration 250*b* of the connection element 200*b*. The auxiliary element connection configuration 350*b* is generally configured to engage the connection configuration 250*b* of the connection element 200*b* as described above in conjunction with FIG. 6.

Figure 9:
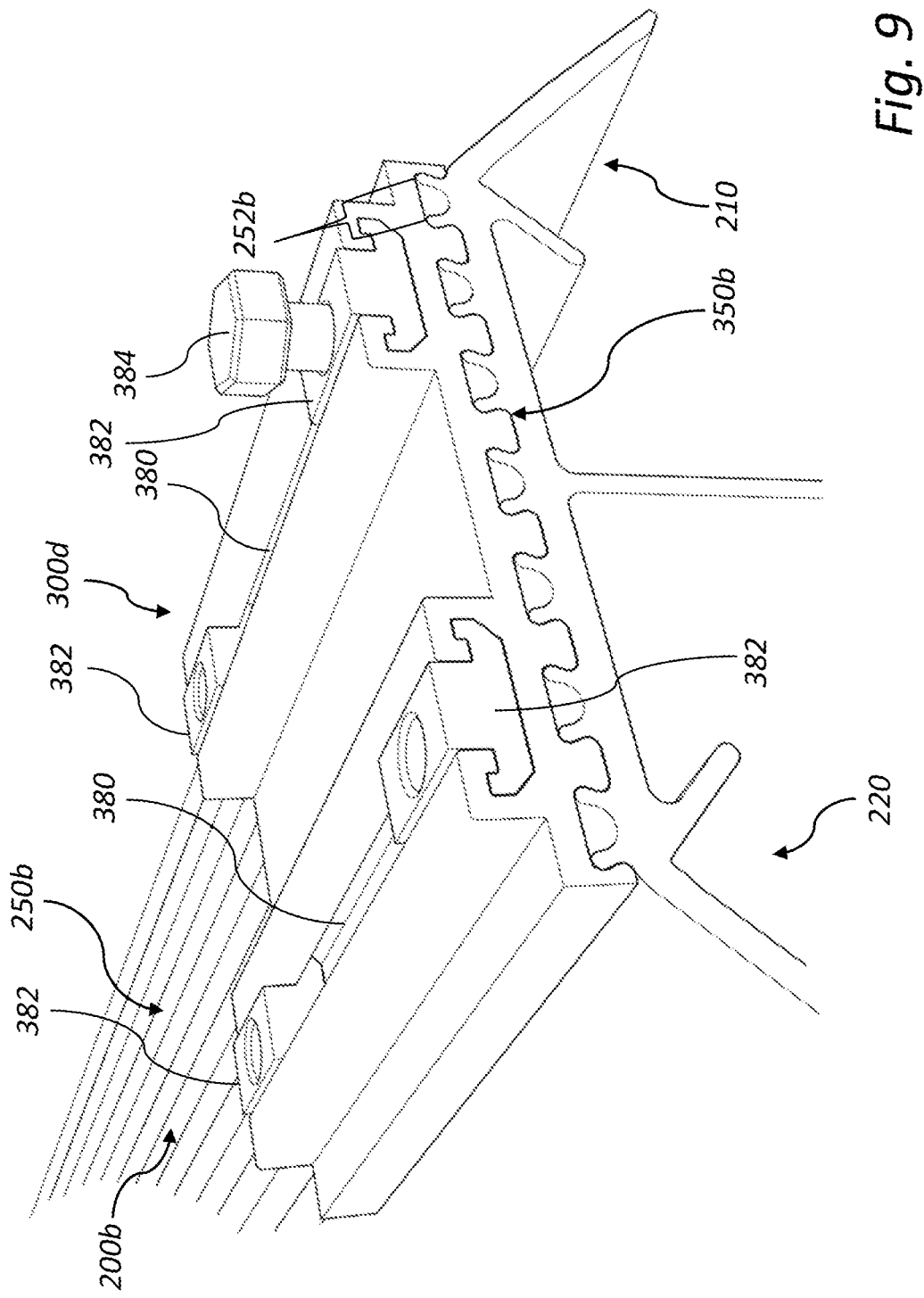
FIG. 9 is a perspective detail view of the connection element in FIG. 5 with an auxiliary element attached.

Now referring to FIG. 9, here is conceptually depicted how a relatively speaking large auxiliary element 300*d* is connected to the connection element 200*b*. The auxiliary element 300*d* includes two parallel slits 380. Further components or auxiliary elements 300 may be connected to the auxiliary element 300*d* by means of the slits 380. In the depicted auxiliary element 300*d*, coupling details 382 are provided in the slits 280. One coupling detail 382 has for illustrative purposes been provided with bolt 384. The bolt 384 may connect to and hold further components. The bolt 384 may lock the coupling detail 382 with respect to the auxiliary element 300*d* while connecting said further components or auxiliary elements 300.

As can be seen in FIG. 9, the auxiliary element 300*d* is connected to the connection element 200*b* by means of the auxiliary element connection configuration 350*b* The auxiliary element connection configuration 350*b* of auxiliary element 300*d* corresponds to auxiliary element connection configuration 350*b* of auxiliary element 300*c* and will not be discussed again to avoid undue repetition.

Figure 10:
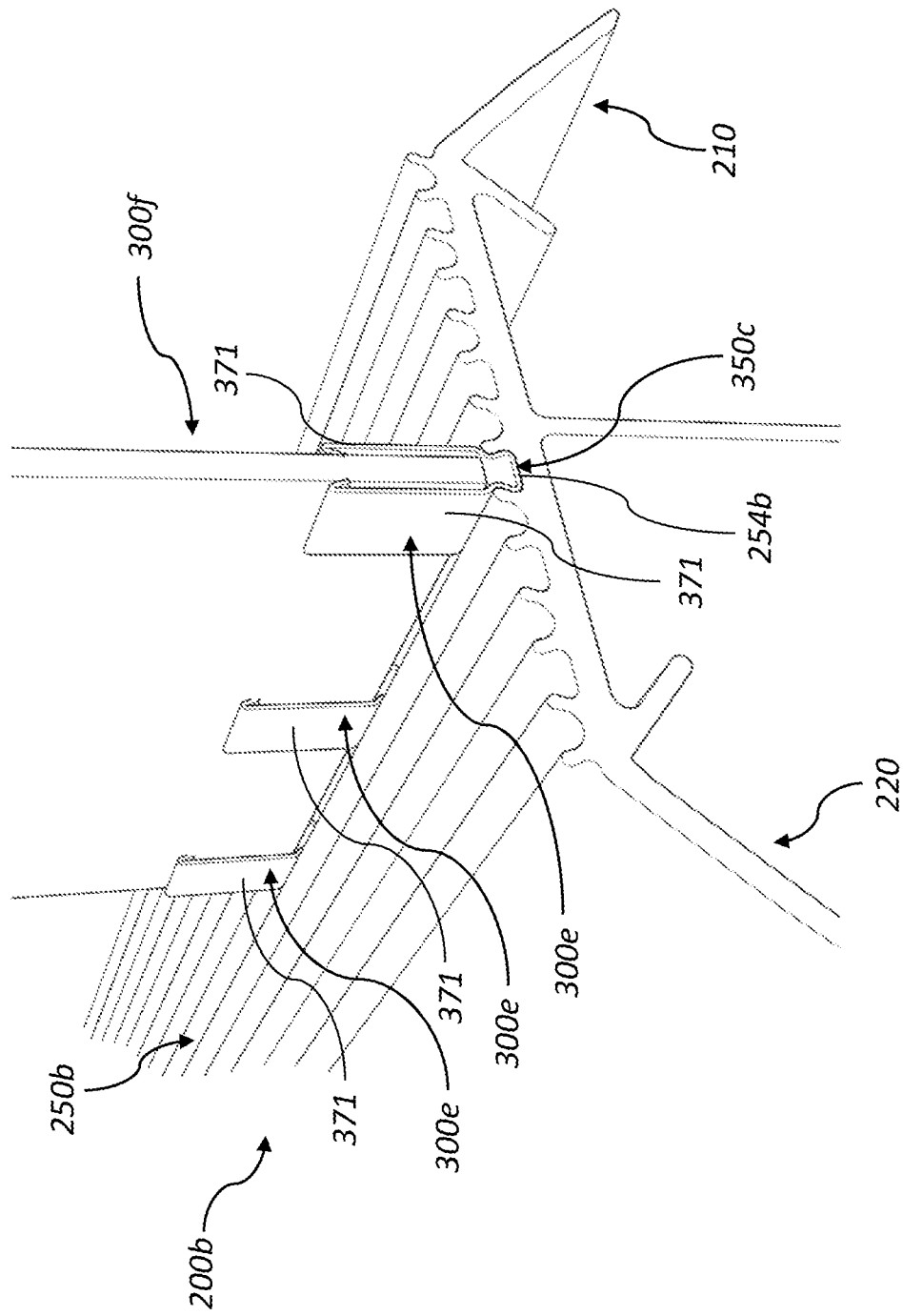
FIG. 10 is a perspective detail view of the connection element in FIG. 5 with auxiliary elements attached.

Now referring to FIG. 10, here is conceptually depicted how three relatively speaking small auxiliary elements 300*e* are connected to the connection element 200*b*. Each auxiliary element 300*e* has the general shape of a clip with two legs 371 extending in a normal direction to the outer surface 202*a* of the connection element 200*b*. Insertion and removal of each auxiliary element 300*e* may be facilitated by pressing the legs 371 towards each other.

The legs 371 of the auxiliary elements 300*e* are jointly holding a further component or auxiliary element 300*f*. The auxiliary element 300*f* has the shape of a plate. The auxiliary element 300*f* may for instance be a plate made of a thermoplastic material. The auxiliary element 300*f* may for instance form part of a body of a vehicle. Each leg 371 of the depicted auxiliary elements 300*e* is bent inwards at its outer end such that a pair of barb-like features is provided at the outer portion of each auxiliary element 300*e*. The barb-like features may facilitate insertion of auxiliary element 300*f*. The barb-like features may counteract removal of auxiliary element 300*f*. The auxiliary element 300*f* counteracts pressing of the legs 371 towards each other hence counteracting removal of the auxiliary element 300*f* from the connection element 200*b*. In other words, the insertion of auxiliary element 300*f* between the legs 371 locks each auxiliary element 300*f* to the connection element 200*b*.

As can be seen in FIG. 10, the auxiliary elements 300*e* are connected to the connection element 200*b* by means of the auxiliary element connection configuration 350*c* provided on the external bottom surface of each auxiliary element 300*e*. The auxiliary element connection configuration 350*c* is hence cooperating with the connection configuration 250*b* of the connection element 200*b*. The auxiliary element connection configuration 350*c* is integrally formed with the auxiliary element 300*e*. The auxiliary element connection configuration 350*c* is forming a bottom portion of the clip-like auxiliary element 300*e*. The auxiliary element connection configuration 350*c* is configured to engage a single slot 254*b* of the connection configuration 250*b* of the connection element 200*b*. The auxiliary element connection configuration 350*c* is configured to engage the connection configuration 250*b* of the connection element 200*b* as described above in conjunction with FIG. 6.

Figure 11:
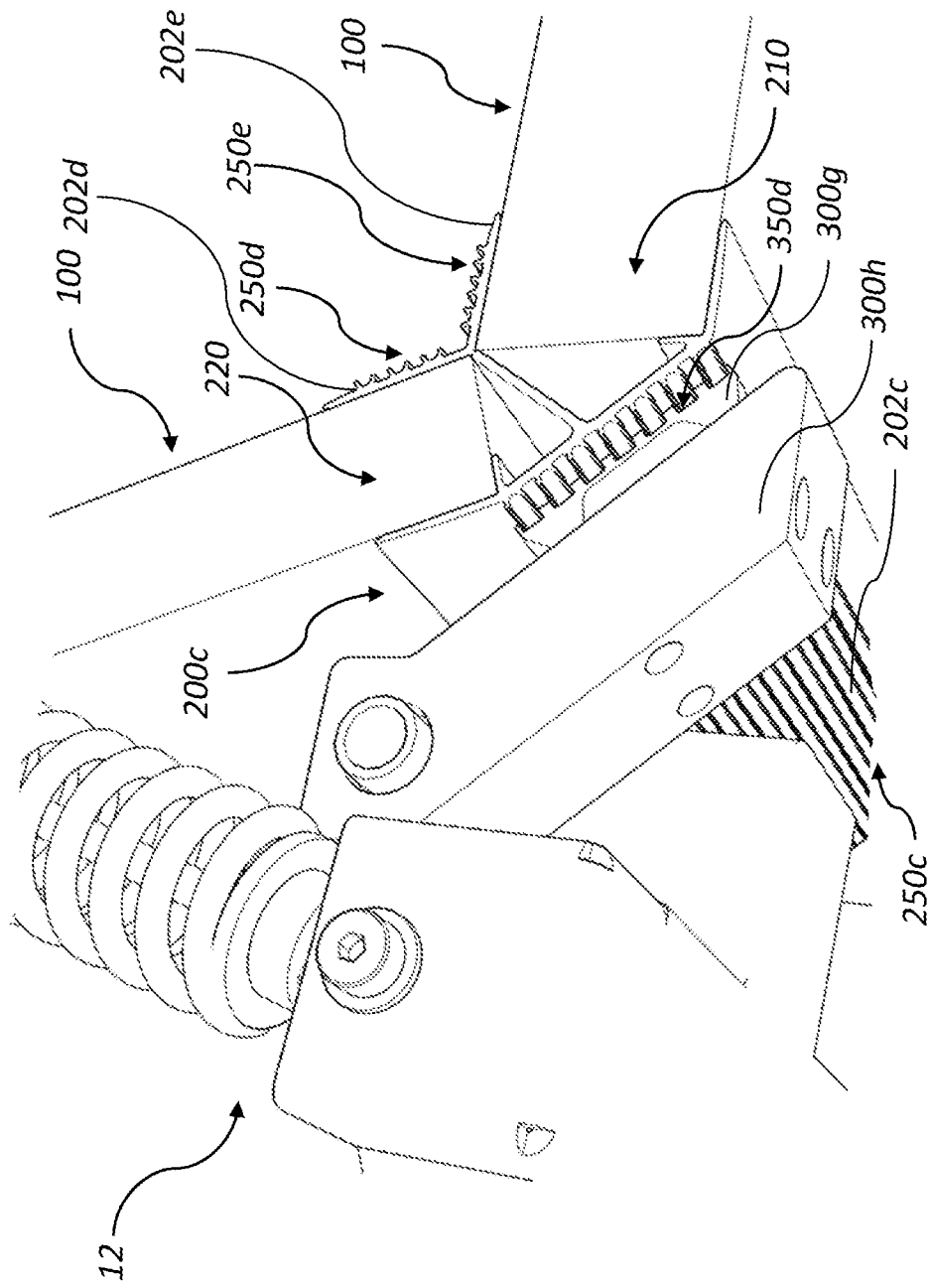
FIG. 11 is a perspective detail view of a connection element with auxiliary elements attached.

Now referring to FIG. 11, here is conceptually depicted how a connection element 200*c* is used to connect two sandwich plate elements 100. The sandwich plate elements 100 are of the type discussed above in conjunction with FIG. 3. The sandwich plate elements 100 will not be discussed here again to avoid undue repetition. The sandwich plate elements 100 are received in a respective recess 210, 220 of the connection element 200*c*.

The connection element 200*c* has three external surfaces 202*c*, 202*d*, 202*e* which are provided with a respective connection configuration 250*c*, 250*d*, 250*e* for a mortise and tenon type joint. The connection configurations 250*c*, 250*d*, 250*e* are depicted as being of the type shown in FIG. 5. However, any connection configuration may be used to advantage. The type of connection configuration of the type shown in FIG. 4 may be used to advantage.

In the depicted connection element 200*c* there are no auxiliary elements 300 connected to the connection configurations 250*d*, 250*e* provided on the external surfaces 202*d*, 202*e*. As is understood, these connection configurations 250*d*, 250*e* may however be used to connect auxiliary elements 300 as described above in conjunction to FIGS. 6-10.

In the depicted connection element 200*c* there is an auxiliary element 300*g* connected to the connection configuration 250*c* provided on the external surface 202*c* of the connection element 200*c*.

As can be seen in FIG. 11, the auxiliary element 300*g* is connected to the connection element 200*c* by means of the auxiliary element connection configuration 350*d* provided on the external surface of the auxiliary element 300*g*. The auxiliary element connection configuration 350*d* is hence cooperating with the connection configuration 250*c* of the connection element 200*g*. The auxiliary element connection configuration 350*d* of auxiliary element 300*d* corresponds to auxiliary element connection configuration 350*b* of auxiliary element 300*c* and will not be discussed again to avoid undue repetition. Hence, the auxiliary element connection configuration 350*d* is configured to engage all seven protrusions 252*b* of the connection configuration 250*c* of the connection element 200*b*. The auxiliary element connection configuration 350*d* is configured to engage the connection configuration 250*c* of the connection element 200*c* as described above in conjunction with FIG. 6.

It is further depicted in FIG. 11 how an auxiliary element 300*h* forming part of a wheel suspension 12 of a chassis 10 is connected to the auxiliary element 300*g* by being bolted to the auxiliary element 300*g*. The wheel suspension includes further components or auxiliary elements 300. It is to be noted that a wheel suspension 12 of the type depicted in FIG. 11 is shown in its entirety in FIG. 1. The connection element 200' in FIG. 1 corresponds to the connection element 200*c* in FIG. 11.

Above, a number of different auxiliary elements 300*a-h* have been discussed and exemplified. All of those auxiliary elements 300*a-h* may be used to advantage in a chassis 10. Further, all of those auxiliary elements 300*a-h* may be used to advantage in different suitable combinations in a chassis 10.

Figure 12:
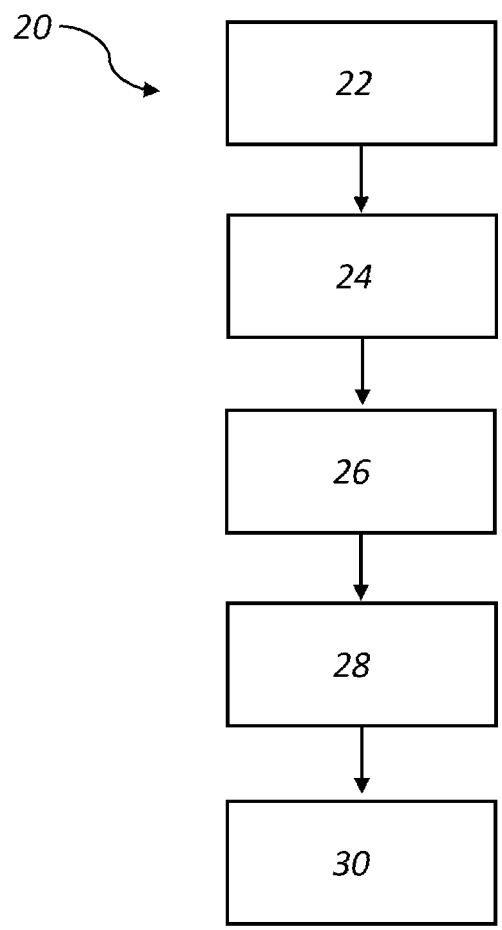
FIG. 12 is a flow scheme of a method for forming a chassis.

Now referring to FIG. 12 here is shown a flow chart of a method 20 for forming a chassis 10 for a vehicle.

The method 20 includes providing 22 a plurality of sandwich plate elements 100. Each plate element 100 comprising a plate core 150 and a first and second plate skin 110, 120. The first plate skin 110 is arranged to at least partly cover a first major surface of the plate core, thereby forming a first major outer surface 115 of the sandwich plate element 100. The second plate skin 120 is arranged to at least partially cover a second major surface of the plate core 150 thereby forming a second major outer surface 125 of the sandwich plate element 100. The first and second major outer surfaces 115, 125 are being opposite to each other.

The method 20 includes providing 24 a plurality of connection elements 200, 200', 200*a-c*. Each connection element 200, 200', 200*a-c* comprises two or more recesses 210, 220, each recess 210, 220 comprises a first and a second inner surface 213, 214, 223, 224 and being configured to receive an edge portion 160 of one of the plurality of sandwich plate elements 100, such that at least a portion of the first major outer surface 115 of the sandwich plate element 100 interacts with the first inner surface 213, 214, 223, 224 of the recess 210, 220 and at least a portion of the second major outer surface 125 of the sandwich plate element 100 interacts with the second inner surface 213, 214, 223, 224 of the recess 210, 220. The plurality of connection elements 200, 200', 200*a-c* comprises at least one connection element 200', 200*a-c* which has at least one external surface 202*a*-202*e* provided with a connection configuration 250*a*-250*e* for a mortise and tenon type joint.

The method 20 includes providing 26 at least one auxiliary element 300, 300*a-h* which has an outer surface which is provided with an auxiliary element connection configuration 350*a*-350*d* which is complementary to the connection configuration 250*a*-250*e* of the at least one connection element 200', 200*a-c*.

The method 20 proceeds with arranging 28 an edge portion 160 of each of the plurality of sandwich plate elements 100 into a recess 210, 220 of one of the plurality of connection elements 200', 200*a-c*.

The method 20 proceeds with connecting 30 the at least one auxiliary element 300, 300*a-h* to the at least one connection element 200', 200*a-c* by means of the auxiliary element connection configuration 350*a*-350*d* and the connection configuration 250*a*-250*e* of the at least one connection element 200', 200*a-c*. Hence, the method 20 includes connecting the parts described above to form a chassis 10.

It will be appreciated that the present inventive concept is not limited to the variants shown. Several modifications and variations are thus conceivable within the scope of the invention which thus is defined by the appended claims.

The invention claimed is:

1. A chassis for a vehicle, the chassis comprising a plurality of sandwich plate elements and a plurality of connection elements for connecting said plurality of sandwich plate elements, wherein,
the sandwich plate elements each comprise a plate core and a first and second plate skin, wherein the first plate skin is arranged to at least partly cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being opposite to each other,
wherein each connection element comprises two or more recesses, each recess comprising a first and a second inner surface and being configured to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess, and
wherein the plurality of connection elements comprises at least one connection element which has at least one external surface provided with a connection configuration for a mortise and tenon type joint.

2. The chassis according to claim 1, wherein the connection configuration comprises a slot of mortise type and/or a projection of tenon type.

3. The chassis according to claim 2, wherein the slot and/or projection has a straight extension along the at least one external surface of said at least one connection element.

4. The chassis according to claim 2, wherein the connection configuration comprises a plurality of slots of mortise type and/or projections of tenon type extending in parallel.

5. The chassis according to claim 1, wherein the chassis further comprises at least one auxiliary element which is connectable to the at least one connection element by means of an outer surface which is provided with an auxiliary element connection configuration which is complementary to the connection configuration of the at least one connection element.

6. The chassis according to claim 5, wherein the connection configuration comprises a slot of mortise type and/or a projection of tenon type and wherein the auxiliary element connection configuration is configured for cooperation with a single slot or projection of the connection configuration of the at least one connection element.

7. The chassis according to claim 5, wherein the connection configuration comprises a slot of mortise type and/or a projection of tenon type and wherein the auxiliary element connection configuration is configured for cooperation with a plurality of slots and/or projections of the connection configuration of the at least one connection element.

8. The chassis according to claim 5, wherein the at least one auxiliary element is a coupling element for attachment of an additional element to the chassis.

9. The chassis according to claim 5, wherein the connection configuration and/or the auxiliary element connection configuration comprises a projection of tenon type which is provided with a groove extending in a longitudinal direction of the projection and configured to receive a locking member.

10. The chassis according to claim 1, wherein a connection element is made of metal.

11. The chassis according to claim 1, wherein the first and second plate skin of a sandwich plate element is made from a fibre-reinforced polymer material.

12. The chassis according to claim 1, wherein the plate core of a sandwich plate element is made from a polymeric foam.

13. The chassis according claim 1, wherein edge portions received in the recesses are bonded to the first and second inner surfaces of said recesses by an adhesive.

14. The chassis according to claim 1, wherein the first and second major outer surfaces of the sandwich plate elements are at least partially parallel.

15. A method for forming a chassis for a vehicle, the method comprising:
providing a plurality of sandwich plate elements, each plate element comprising a plate core and a first and second plate skin, wherein the first plate skin is arranged to at least partly cover a first major surface of the plate core, thereby forming a first major outer surface of the sandwich plate element, and the second plate skin is arranged to at least partially cover a second major surface of the plate core thereby forming a second major outer surface of the sandwich plate element, said first and second major outer surfaces being opposite to each other,
providing a plurality of connection elements, each connection element comprising two or more recesses, each recess comprising a first and a second inner surface and being configured to receive an edge portion of one of the plurality of sandwich plate elements such that at least a portion of the first major outer surface of the sandwich plate element interacts with the first inner surface of the recess and at least a portion of the second major outer surface of the sandwich plate element interacts with the second inner surface of the recess, wherein the plurality of connection elements comprises at least one connection element which has at least one external surface provided with a connection configuration for a mortise and tenon type joint,
providing at least one auxiliary element which has an outer surface which is provided with an auxiliary element connection configuration which is complementary to the connection configuration of the at least one connection element,
arranging an edge portion of each of the plurality of sandwich plate elements into a recess of one of the plurality of connection elements, and
connecting the at least one auxiliary element to the at least one connection element by means of the auxiliary element connection configuration and the connection configuration of the at least one connection element.

* * * * *